(12) United States Patent
Manor et al.

(10) Patent No.: US 12,477,008 B2
(45) Date of Patent: Nov. 18, 2025

(54) ZERO HIT ANALYSIS SYSTEM

(71) Applicant: CARDINALOPS LTD., Tel Aviv (IL)

(72) Inventors: Yair Manor, Netanya (IL); Amihai Hadar, Herzliya (IL); Yair Rascovsky, Beer Sheva (IL); David Baumstein, Petah Tikva (IL); Guy Haimovitz, Tel Aviv (IL)

(73) Assignee: CardinalOps Ltd., Tel Aviv (IL)

( * ) Notice: Subject to any disclaimer, the term of this patent is extended or adjusted under 35 U.S.C. 154(b) by 217 days.

(21) Appl. No.: 18/454,932

(22) Filed: Aug. 24, 2023

(65) Prior Publication Data
US 2025/0071145 A1    Feb. 27, 2025

(51) Int. Cl.
*H04L 9/40*          (2022.01)

(52) U.S. Cl.
CPC .......... *H04L 63/20* (2013.01); *H04L 63/1425* (2013.01)

(58) Field of Classification Search
CPC .. H04L 63/0263; H04L 63/1425; H04L 63/20
See application file for complete search history.

(56) References Cited

U.S. PATENT DOCUMENTS

| | | |
|---|---|---|
| 10,049,220 B1 | 8/2018 | Hatsutori et al. |
| 11,036,867 B2 | 6/2021 | Bhatia et al. |
| 2015/0222667 A1 | 8/2015 | Nayshtut et al. |
| 2016/0344738 A1 | 11/2016 | Dotan et al. |
| 2020/0329011 A1* | 10/2020 | Cai ..................... H04L 63/0263 |
| 2021/0084013 A1* | 3/2021 | Mutnuru ............. H04L 41/0894 |
| 2021/0273970 A1* | 9/2021 | Alshech ............... H04L 63/1433 |
| 2021/0320903 A1* | 10/2021 | Kalaycilar ............ G06F 18/214 |
| 2024/0348649 A1* | 10/2024 | Schwartz ................ H04L 63/20 |
| 2024/0348664 A1* | 10/2024 | Mohanram ............. H04L 63/02 |

OTHER PUBLICATIONS

Cai, Gaocheng, Qinghua Su, and Zhongbo Hu. "Binary searching iterative algorithm for generating test cases to cover paths." Applied Soft Computing 113: 107910. (Year: 2021).*
Bodhe, Shraddha. Algorithms for Efficient Fail Data Collection for Defect Diagnosis. Diss. Purdue University. (Year: 2017).*
Acharya, Subrata, et al. "Optwall: A Hierarchical Traffic-Aware Firewall." NDSS. (Year: 2007).*
Brucker, Achim D., Lukas Brugger, and Burkhart Wolff. "Formal firewall conformance testing: An application of test and proof techniques." Software Testing, Verification and Reliability 25.: 34-71. (Year: 2015).*
Swain, Santosh Kumar, Durga Prasad Mohapatra, and Rajib Mall. "Test case generation based on use case and sequence diagram." International Journal of Software Engineering 3.2: 21-52. (Year: 2010).*
Pluralsight LLC, "What is Google Cloud Platform (GCP)?," pp. 1-7, years 2004-2023, as downloaded from https://www.pluralsight.com/resources/blog/cloud/what-is-google-cloud-platform-gcp.
Microsoft, "Azure Cloud Solution Provider," pp. 1-5, year 2023, as downloaded from https://azure.microsoft.com/en-us/pricing/offers/ms-azr-0145p.

* cited by examiner

*Primary Examiner* — John M Macilwinen
(74) *Attorney, Agent, or Firm* — Meitar Patents Ltd.

(57) ABSTRACT

In one embodiment, a device includes a processor configured to receive a given rule from a service, the given rule including multiple statements, identify a zero-hit statement being a statement of the multiple statements of the given rule causing zero hits against the log data, and perform an action responsively to identifying the zero-hit statement.

25 Claims, 4 Drawing Sheets

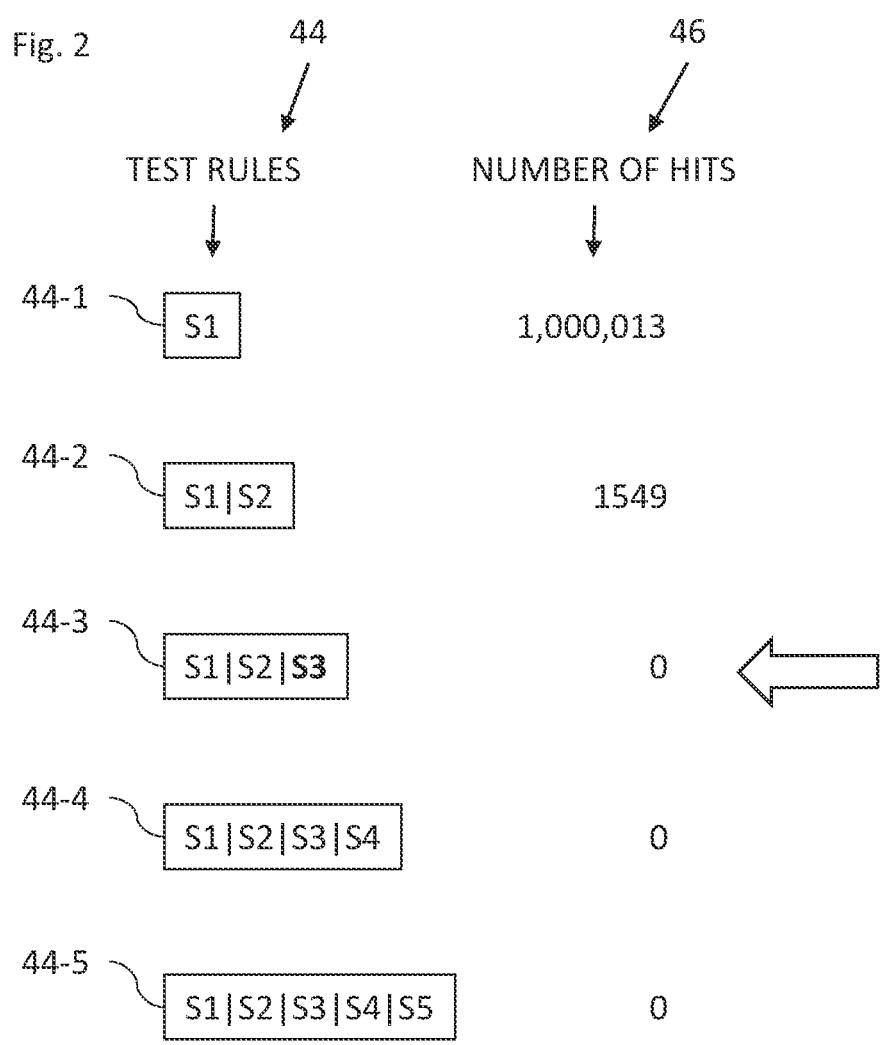

ZERO HIT ANALYSIS SYSTEM

FIELD OF THE INVENTION

The present invention relates to computer systems, and in particular, but not exclusively, to rule-based engine systems.

BACKGROUND

SIEM stands for Security Information and Event Management. It is a software platform that aggregates, analyzes, and stores data from various sources, including syslog servers. SIEMs refer to centralized log management tools that integrate with different applications, systems, servers, etc. to take in data from each service. SIEMs are used for real-time security event analysis to help with investigation, early threat detection and incident response.

SIEM servers work by gathering all the event logs from configured devices. The logs are sent to a collector, which typically runs on a virtual machine inside the host network. The logs are securely sent from the collector to the SIEM. In other cases, the logs can be sent directly to the SIEM server, or the logs can be sent to a storage location (e.g., an S3 bucket), from which the SIEM server pulls them periodically.

SIEM servers use rules that are predetermined and help security teams define threats and generate alerts. Simple SIEM rules detect an event type and trigger a response, while composite rules nest or join two or more rules or statements to achieve a more complex behavior. Common SIEM correlation rules include brute force detection, impossible travel, excessive file copying, distributed denial-of-service (DDOS) attack, file integrity change, and handling false positives.

SUMMARY

There is provided in accordance with an embodiment of the present disclosure, a device, including a processor configured to receive a given rule from a detection service, the given rule including multiple statements, identify a zero-hit statement being a statement of the multiple statements of the given rule causing zero hits against the log data, and perform an action responsively to identifying the zero-hit statement, and a memory configured to store data used by the processor.

Further in accordance with an embodiment of the present disclosure the processor is configured to generate a plurality of different test rules from the statements of the received given rule, provide the test rules to the service to run each of the test rules against log data, receive a number of hits against the log data for each of the test rules, and identify the zero-hit statement based on one of the test rules yielding zero hits against the log data.

Still further in accordance with an embodiment of the present disclosure the processor is configured to identify the zero-hit statement as a first statement of the multiple statements of the given rule causing zero hits against the log data based on one of the test rules yielding zero hits against the log data.

Additionally in accordance with an embodiment of the present disclosure the processor is configured to generate the test rules so that one of the test rules includes a first N statements of the multiple statements of the given rule, and another one of the test rules includes a first M statements of the multiple statements of the given rule, N being different to M, the number of hits against the log data for any one of the test rules indicates a contribution of a last statement of the one test rule, and the processor is configured to identify the zero-hit statement based on the last statement of a shortest one of the test rules yielding zero hits against the log data.

Moreover, in accordance with an embodiment of the present disclosure the processor is configured to select the test rules to be provided to the service using a binary search algorithm.

Further in accordance with an embodiment of the present disclosure the processor is configured to rule out at least one of the statements in the given rule as being the zero-hit statement based on a preliminary analysis of the given rule.

Still further in accordance with an embodiment of the present disclosure the processor is configured to reorder, in at least some of the test rules, sub-statements of one statement selected from the multiple statements of the given rule.

Additionally in accordance with an embodiment of the present disclosure the service is a security information and event management (SIEM) service, and the given rule is a SIEM correlation rule.

Moreover, in accordance with an embodiment of the present disclosure the processor is configured to check whether the zero-hit statement caused non-zero hits last time the given rule was tested by the processor, and check whether the given rule has been amended since the last time the given rule was tested by the processor.

Further in accordance with an embodiment of the present disclosure the processor is configured to correct the zero-hit statement of the given rule.

Still further in accordance with an embodiment of the present disclosure the processor is configured to test the corrected rule using additional test rules generated from the statements of the corrected rule to check that the corrected rule has been fixed.

Additionally in accordance with an embodiment of the present disclosure the processor is configured to provide an alert indicating any one or more of the following the zero-hit statement that is causing zero hits against the log data, that the given rule is broken, to check that the service is receiving log data related to the zero-hit statement.

There is also provided in accordance with another embodiment of the present disclosure, a method, including receiving a given rule from a detection service, the given rule including multiple statements, identifying a zero-hit statement being a statement of the multiple statements of the given rule causing zero hits against the log data, and performing an action responsively to identifying the zero-hit statement.

Moreover in accordance with an embodiment of the present disclosure, the method includes generating a plurality of different test rules from the statements of the received given rule, providing the test rules to the service to run each of the test rules against log data, and receiving a number of hits against the log data for each of the test rules, and wherein the identifying includes identifying the zero-hit statement based on one of the test rules yielding zero hits against the log data.

Further in accordance with an embodiment of the present disclosure the identifying includes identifying the zero-hit statement as a first statement of the multiple statements of the given rule causing zero hits against the log data based on one of the test rules yielding zero hits against the log data.

Still further in accordance with an embodiment of the present disclosure the generating includes generating the test rules so that one of the test rules includes a first N statements of the multiple statements of the given rule, and another one of the test rules includes a first M statements of the multiple statements of the given rule, N being different to M, the number of hits against the log data for any one of the test rules indicates a contribution of a last statement of the one test rule, and the identifying includes identifying the zero-hit statement based on the last statement of a shortest one of the test rules yielding zero hits against the log data.

Additionally in accordance with an embodiment of the present disclosure, the method includes selecting the test rules to be provided to the service using a binary search algorithm.

Moreover, in accordance with an embodiment of the present disclosure, the method includes ruling out at least one of the statements in the given rule as being the zero-hit statement based on a preliminary analysis of the given rule.

Further in accordance with an embodiment of the present disclosure, the method includes reordering, in at least some of the test rules, sub-statements of one statement selected from the multiple statements of the given rule.

Still further in accordance with an embodiment of the present disclosure the service is a security information and event management (SIEM) service, and the given rule is a SIEM correlation rule.

Additionally in accordance with an embodiment of the present disclosure, the method includes checking whether the zero-hit statement caused non-zero hits last time the given rule was tested, and checking whether the given rule has been amended since the last time the given rule was tested.

Moreover, in accordance with an embodiment of the present disclosure, the method includes correcting the zero-hit statement of the given rule.

Further in accordance with an embodiment of the present disclosure, the method includes testing the corrected rule using additional test rules generated from the statements of the corrected rule to check that the corrected rule has been fixed.

Still further in accordance with an embodiment of the present disclosure, the method includes providing an alert indicating any one or more of the following the zero-hit statement that is causing zero hits against the log data, that the given rule is broken, to check that the service is receiving log data related to the zero-hit statement.

There is also provided in accordance with still another embodiment of the present disclosure a software product, including a non-transient computer-readable medium in which program instructions are stored, which instructions, when read by a central processing unit (CPU), cause the CPU to receive a given rule from a detection service, the given rule including multiple statements, identify a zero-hit statement being a statement of the multiple statements of the given rule causing zero hits against the log data, and perform an action responsively to identifying the zero-hit statement.

BRIEF DESCRIPTION OF THE DRAWINGS

The present invention will be understood from the following detailed description, taken in conjunction with the drawings in which:

FIG. 2 is a view of example test rules and corresponding number of hits for use in the system of FIG. 1.

DESCRIPTION OF EXAMPLE EMBODIMENTS

Overview

Figure 1:
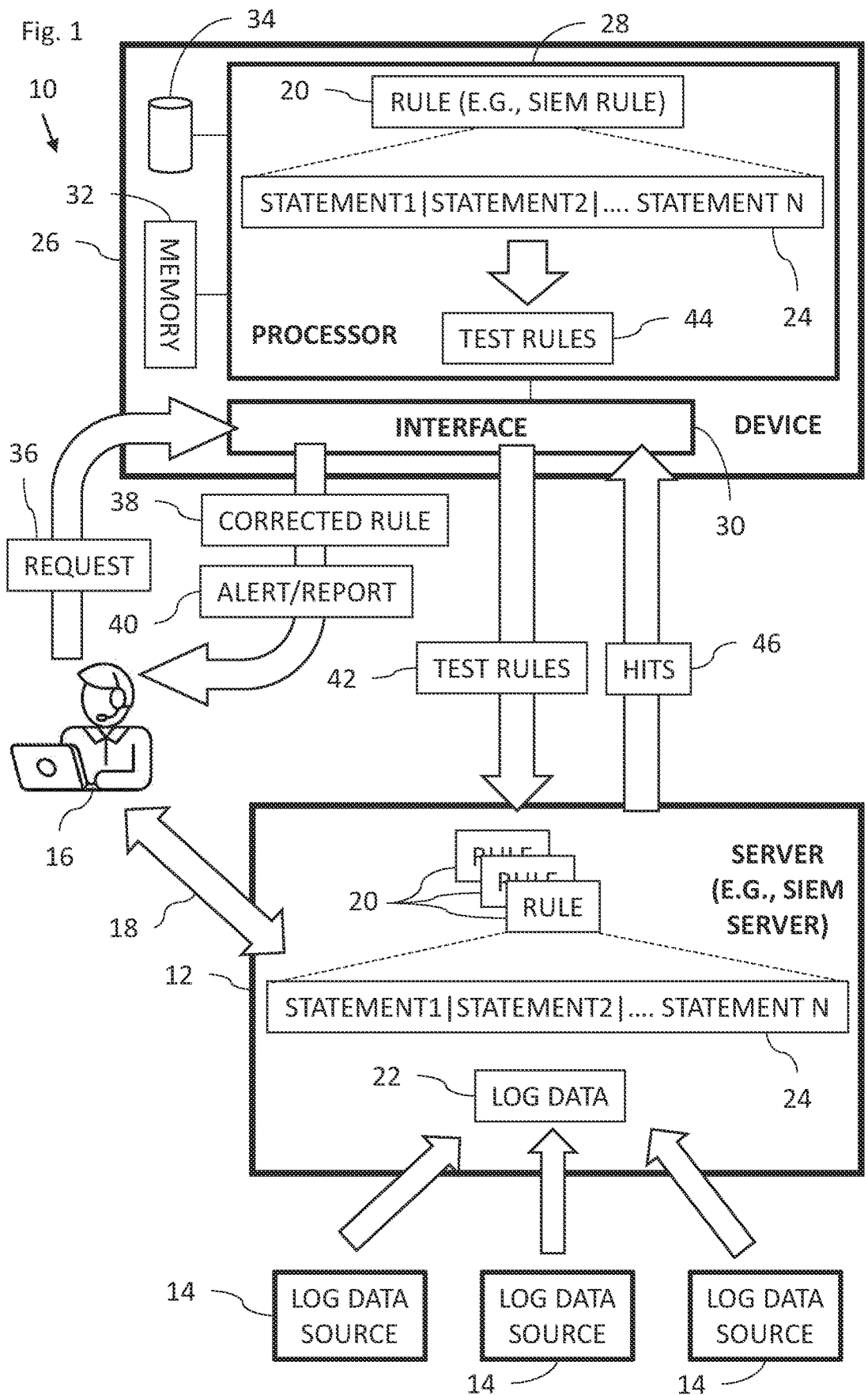
FIG. 1 is a block diagram view of a rule validation system constructed and operative in accordance with an embodiment of the present invention.

There are several problems that can arise with rule-based systems (e.g., security systems), such as SIEM servers running SIEM rules. One of the issues is that the rules may not be updated frequently enough to keep up with changes in the IT environment. This can result in outdated rules that are no longer effective at detecting threats. Also, some organizations may not have the resources or expertise to properly configure and manage their SIEM systems, which can lead to misconfigurations and incorrect rules when rules are updated. Other problems may occur with the SIEM system, such as a failure in the collection system whereby relevant logs are not forwarded to the SIEM system.

Embodiments of the present invention solve at least some of the above drawbacks by providing a system which checks a rule (such as a SIEM or other security rule) to find potential errors in the rule by identifying a statement in the rule which yields zero hits against log data (such as SIEM or security server log data) when run by a server (such as a SIEM or security server). Identifying a statement in the rule yielding zero hits against log data may also lead to identifying a problem with the rule if that statement in the rule is expected to yield non-zero hits. For example, if the statement is not the last or narrowest statement in the rule, the statement may be expected to always provide non-zero hits. This may be particularly true when the same statement yielded non-zero hits when previously checked and now that statement has been amended and yields zero-hits possibly indicating that an error was incorporated into the rule when the rule was amended. If the zero-hit statement is a general or initial statement (i.e., a broadest statement) of the rule, this may indicate that the server running the rules is not receiving relevant log data. The statement yielding zero-hits against log data is referred to herein as a "zero-hit statement".

Alerting a system administrator about the zero-hit statement will allow the system administrator to verify if the zero-hit statement should be yielding zero hits or not, and allow the system administrator to take appropriate action, such as changing the rule. In some embodiments, an error in the zero-hit statement may be identified and corrected, for example, using a dictionary lookup of commonly confused terms and/or based on known terms (e.g., field names) in the log data.

In some embodiments, the system performs an action such as correcting the rule, sending the rule to a rule expert to correct the rule, testing a corrected rule, providing the corrected rule to the system administrator to copy to the server to replace the old rule, or providing an alert to the system administrator. The alert may include any one or more of the following: the zero-hit statement; an indication that the zero-hit statement is a statement that provided non-zero hits last time the given rule was checked; an indication that the given rule was changed since the given rule was last checked; the corrected rule; and/or the zero-hit statement is a general statement indicating that the server is not receiving relevant log data.

In some embodiments, the zero-hit statement is found by generating multiple test rules based on different statements from the given rule. The test rules are sent to the server to be run against the log data and the number of hits against each test rule are reported back to the system by the server. In some embodiments, each test rule includes a different number of statements taken in order from the beginning of the given rule. For example, one test rule may include the first three statements of the given rule and another test rule may include the first five statements of the given rule. The last statement of the shortest test rule, which yields zero hits against the log data is generally the zero-hit statement. In some embodiments, many test rules are sent to the server at one time. In other embodiments, one test rule is sent to the server and based on the hits generated by that test rule another test rule may be sent to the server to narrow down the search for the zero-hit statement. The search for the zero-hit statement may take the form of a binary search as described in disclosed embodiments, or as a progressive search (e.g., send a test rule including one statement, then send a test rule including two statements, and so on).

In some cases, the statements may be manipulated as the test rules are built. For example, the test rules may be generated from one or more sub-statements (i.e., a part or parts of a statement) as well as from complete statements from the given rule. In some embodiments, in at least some of the test rules, sub-statements of one (or more) statements may be reordered. For example, the initial (broadest) statement of the given rule may include three sub-statements. In some systems e.g., Splunk, all three sub-statements are checked simultaneously e.g., as ANDs. For the test rules, the sub-statements may be processed in different orders by structuring each of the sub-statements as a separate statement in the test rules.

In some cases, a statement such as, Source=Windows 'windows_login_events', may be processed by a macro defined within Splunk or a similar server, and replaced with several equivalent or similar conditions (e.g., "EventID=4624 OR EventID=4625") process the following rule: Source=Windows EventID=4624 OR EventID=4625.

In some embodiments, the above checking may be applied periodically (e.g., daily, or weekly) to one or more rules (e.g., all rules) running on a server, for example, to check the rules against a baseline to see if the zero-hit statements of the rules have changed.

System Description

Reference is now made to FIG. 1, which is a block diagram view of a rule validation system 10 constructed and operative in accordance with an embodiment of the present invention. The rule validation system 10 includes a server 12 such as a security information and event management (SIEM) server or service or any suitable server or detection service which tracks events and reports on those events using rules (e.g., SIEM correlation rules or security rules). The server 12 receives log data 22 from different log data sources 14 or from one or more collectors (not shown) which collect log data from the log data sources 14.

A system administrator 16 interacts (arrow 18) with the server 12 and configures rules 20 that should be run by the server 12 against the log data 22, for example, when the log data 22 is received from the log data sources 14. The server 12 may also generate an alert to the system administrator 16 when one of the rules provides a positive match with one or more events in the log data 22. Each rule 20 includes a respective number of statements 24 which define what the rule is checking for. The statements may be ordered in any suitable manner. However, in many cases, the statements are structured to start with the broadest statement and then progress to narrower statements so that the final statement is generally viewed as being the narrowest statement. The statements may be separated by any suitable symbol(s), for example, using a pipe symbol "|". The server 12 may provide Application Programming Interfaces (APIs) to allow other entities (e.g., the system administrator 16 and a rule checking device 26) to interact with the server 12.

The rule validation system 10 also includes rule checking device 26, which includes a processor 28, interface 30, memory 32, and database 34. The device 26 may receive requests 36 from the system administrator 16 to check one or more of the rules 20 to determine if the rule(s) is(are) behaving as expected.

The interface 30 (which may include a network interface and/or a communication data bus interface) is configured to receive the requests 36 from the system administrator 16 and provide data (such as a corrected rule 38 and alerts or reports 40) to the system administrator 16. The interface 30 may also be configured to receive rules 20 and other data from the server 12 as well as provide test rules 42 to the server 12, described in more detail below. The memory 32 is configured to store data used by the processor 28. The database 34 may be configured to store data such as historical data of previously tested rules 20 and historical data related to previously found zero-hit statements of the rules 20, described in more detail below.

The processor 28 is configured to test one or more of the rules 20, for example, in response to requests 36 from the system administrator 16. The processor 28 is configured to request that the server 12 provide a given rule to the processor 28. The server 12 is configured to provide the given rule to the processor 28. The processor 28 is configured to generate test rules 44 from the statements 24 of the given rule as described in more detail with reference to FIGS. 2 and 3. The processor 28 is configured to provide the test rules 44 to the server 12 (either one by one or in batch) as described in more detail with reference to FIG. 3. The server 12 is configured to run the test rules 44 against the log data 22 and provide to the processor 28 the respective number of hits 46 achieved from running the test rules 44 against the log data 22. Based on the number of hits 46, the processor 28 finds the statement 24 that causes zero-hits against the log data 22 thereby yielding the zero-hit statement of the given rule 20. In response to finding the zero-hit statement, the processor 28 may perform an action such as correcting the zero-hit statement and/or issuing an alert to the system administrator 16 about the zero-hit statement, as described in more detail with reference to FIG. 3.

In some embodiments, the functionality of the device 26 is executed by a cloud-based server. In some embodiments, the functionality of the server 12 is executed by a cloud-based server. In some embodiments, the functionality of the server 12 and the device 26 may be executed by the same device or server and/or the same processor.

Reference is now made to FIG. 2, which is a view of example test rules 44 and corresponding number of hits 46 for use in the system 10 of FIG. 1. FIG. 2 shows five example test rules. The first test rule 44-1 includes one statement, i.e., statement 1 (S1) from the given rule 20. The second test rule 44-2 includes two statements, i.e., statements 1 and 2 (S1 and S2) from the given rule 20. The third test rule 44-3 includes three statements, i.e., statements 1-3 (S1-S3) from the given rule 20. The fourth test rule 44-4 includes four statements, i.e., statements 1-4 (S1-S4) from the given rule 20. The fifth test rule 44-5 includes five statements, i.e., statements 1-5 (S1-S5) from the given rule 20.

Each of the test rules 44 are run against the log data 22 by the server 12. Each of the test rules 44 yields a number of hits 46 against the log data 22 based on the specific statements 24 included in the respective test rules 44. For test rule 44-1, statement 1 is checked against the log data 22 and yields 1,000,013 hits. For test rule 44-2, a combination of statements 1 and 2 is checked against the log data 22 and yields 1549 hits. For test rule 44-3, a combination of statements 1-3 is checked against the log data 22 and yields 0 hits. For test rule 44-4, a combination of statements 1-4 is checked against the log data 22 and yields 0 hits. For test rule 44-5, a combination of statements 1-5 is checked against the log data 22 and yields 0 hits. Therefore, it can be seen that test rule 44-3 is the shortest test rule 44 yielding zero hits, and therefore the last statement, statement S3, of test rule 44-3 is the zero-hit statement causing the given rule to yield zero results.

In some embodiments, the zero-hit statement may be found by sending all the test rules 44 to the server 12 for checking against the log data 22. In some embodiments, the test rules 44 are sent one by one to the server 12 for checking against the log data 22 starting from the shortest test rule until the zero-hit statement is found.

In some embodiments, the test rules 44 may be sent to the server 12 for checking against the log data 22 using a binary search algorithm. For example, if the given rule includes 10 statements and the processor 28 generates 10 different test rules 44. The processor 28 may first send a "middle" test rule 44 including 5 statements to the server 12 for checking. If the "middle" test rule 44 yields zero results, the processor 28 may send the $2^{nd}$ or $3^{rd}$ test rule including 2 or 3 statements, respectively, to the server 12 for checking. If the $2^{nd}$ or $3^{rd}$ test rule 44 does not yield zero results, the processor 28 may send the $7^{th}$ or $8^{th}$ test rule including 7 or 8 statements, respectively, to the server 12 for checking. In a similar manner, the search for the zero-hit statement may be performed.

Figure 3A:
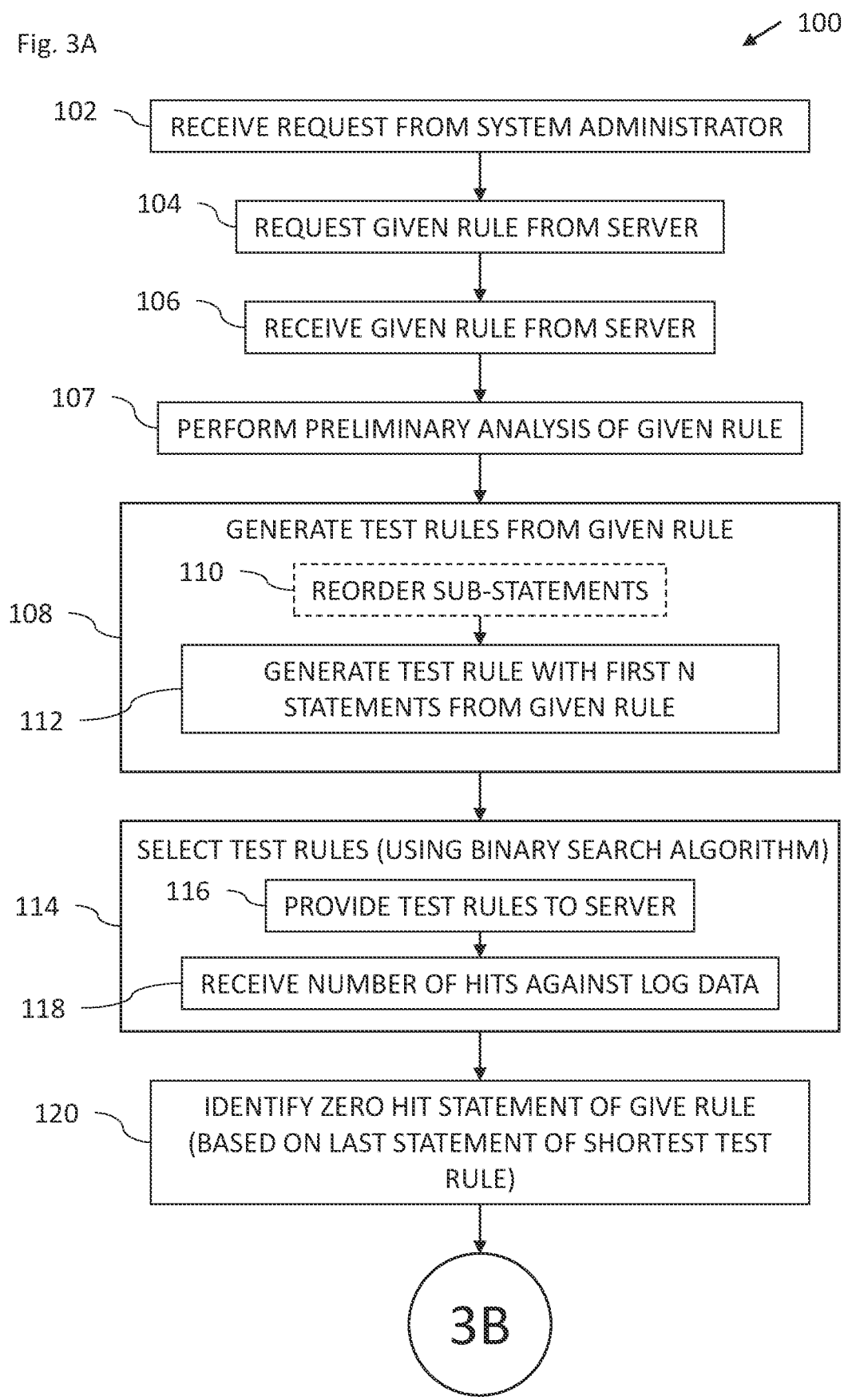
FIGS. 3A-B is a flow chart including steps in a method of operation of the system of FIG. 1.
Figure 3B:
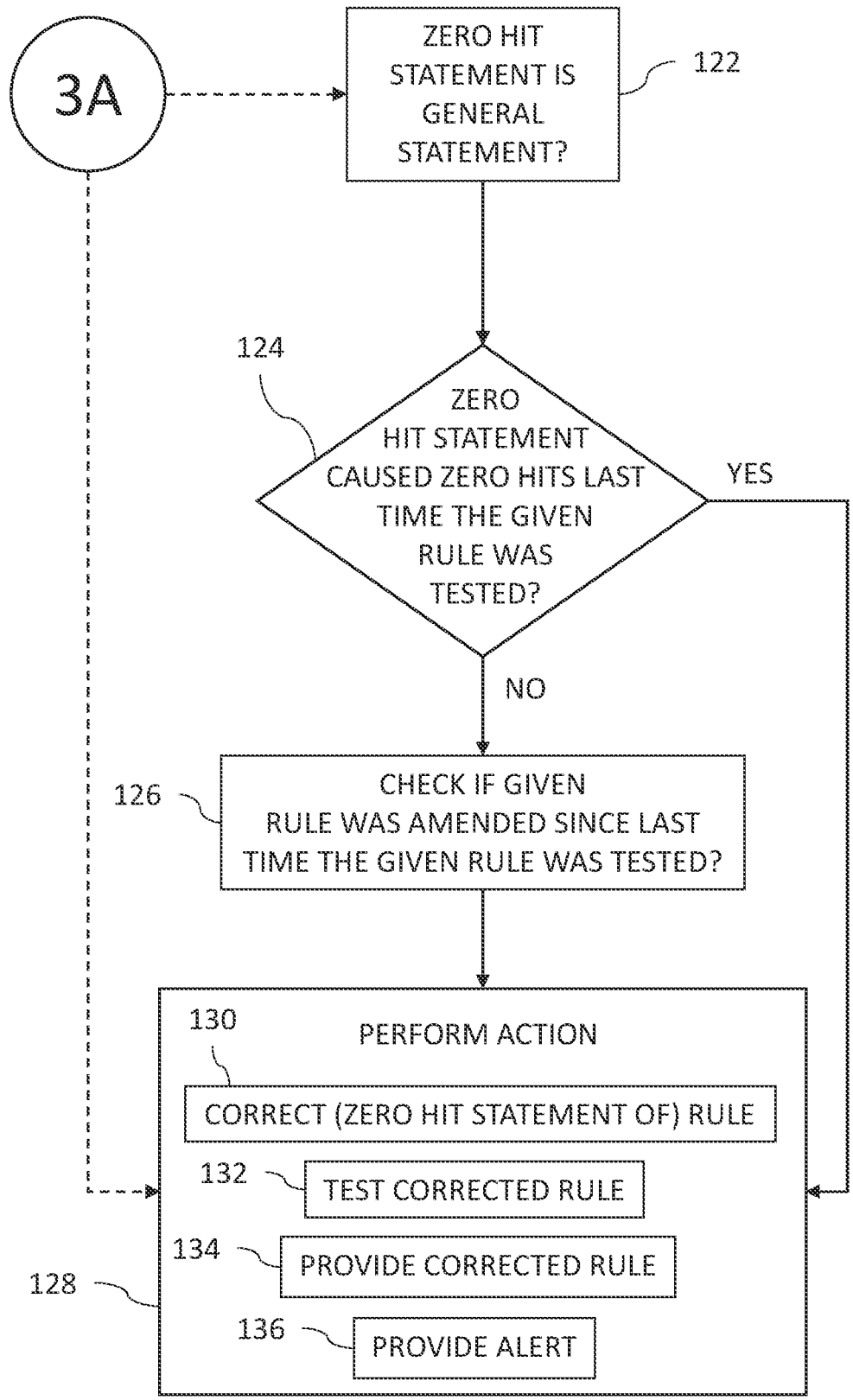

Reference is now made to FIGS. 3A-B, which is a flow chart 100 including steps in a method of operation of the system 10 of FIG. 1. In some embodiments, the processor 28 is configured to receive a request from the system administrator 16 to check a given rule (block 102). The processor 28 is configured to request the given rule from the server 12 (block 104) for example using an API provided by the server 12 to request rules. The interface 30 is configured to receive the given rule from the server 12 (block 106). The processor 28 is configured to receive the given rule. The processor 28 may be configured to rule out at least one of the statements 24 in the given rule as being the zero-hit statement based on a preliminary analysis of the given rule (block 107). For example, the given rule may include a general statement (e.g., the initial broadest statement of the rule) which is also included in another rules, and it is known from previous checks that this general statement is not a zero-hit statement.

The processor 28 is configured to generate different test rules 44 from the statements 24 of the received given rule (block 108). It should be noted that the test rules 44 may be generated from one or more sub-statements (i.e., a part or parts of a statement) as well as from complete statements from the given rule.

In some embodiments, the processor 28 may be configured to reorder, in at least some of the test rules 44, sub-statements of one (or more) statements selected from the multiple statements of the given rule (block 110). For example, the initial (broadest) statement of the given rule may include three sub-statements. In some systems e.g., Splunk, all three sub-statements are checked simultaneously e.g., as ANDs. For the test rules 44, the sub-statements may be processed in different orders by structuring each of the sub-statements as a separate statement in the test rules 44.

For example, in some systems the following two statements would be processed in the same manner without considering the order of the sub-statements:
1. "search index=windows process_name=service.exe eventId=4688"; and
2. "search index=windows eventId=4688 process_name=service.exe".

In some embodiments, the processor 28 is configured to generate the test rules 44 so that one of the test rules 44 includes a first N statements (according to the order of the statements in the given rule) of the multiple statements of the given rule, and another one of the test rules 44 includes a first M statements (according to the order of the stats in the given rule) of the multiple statements of the given rule, N being different to M, and so on (block 112). For example, a third test rule includes the first three statements from the given rule, and a fourth test rule includes the first four statements from the given rule.

In some embodiments, the processor 28 is configured to select the test rules 24 to be provided to the server 12 (block 114). In some embodiments, the processor 28 may select all the test rules to be sent to the server 12 in one batch for checking against the log data 22. In some embodiments, the processor 28 may select test rules 44 for sending one by one to the server 12 starting from the shortest test rule until the zero-hit statement is found.

In some embodiments, the test rules 44 may be selected for sending to the server 12 for checking against the log data 22 using a binary search algorithm. For example, if the given rule includes 10 statements and the processor 28 generates 10 different test rules 44. The processor 28 may first send a "middle" test rule 44 including 5 statements to the server 12 for checking. If the "middle" test rule 44 yields zero results, the processor 28 may send the $2^{nd}$ or $3^{rd}$ test rule including 2 or 3 statements, respectively, to the server 12 for checking. If the $2^{nd}$ or $3^{rd}$ test rule 44 does not yield zero results, the processor 28 may send the $7^{th}$ or $8^{th}$ test rule including 7 or 8 statements, respectively, to the server 12 for checking. In a similar manner, the search for the zero-hit statement may be performed.

The processor 28 is configured to provide the test rules 44 to the server 12 to run each of the test rules 44 against the log data 22 (block 116). It should be noted that the time frame of the log data 22 over which the search is performed for the test rules 44 may be greater than the time frame of the log data 22 over which the search would normally be performed for the given rule by the server 12. Selecting the correct time frame to use may depend on how frequently the events are expected to occur. For example, a longer time frame may be allocated to more rare events. The processor 28 is configured to receive a number of hits 46 against the log data 22 for each of the test rules 44 (block 118). The number of hits 46 against the log data 22 for any one of the test rules 44 may indicate a contribution of the last statement of that test rule.

The processor 28 is configured to identify the zero-hit statement of the given rule (block 120). The zero-hit statement is the statement of the given rule causing zero hits against the log data 22. The processor 28 is configured to identify the zero-hit statement based on one of the test rules yielding zero hits against the log data 22. When multiple test rules are sent to the server 12, more than one test rule may yield zero hits leading to uncertainty as to which statement is the zero-hit statement. Therefore, the zero-hit statement is generally found to be the first statement (when traversing the statements from the initial broadest statement to the narrowest statement) that causes the zero hits against the log data 22. Therefore, in some embodiments, the processor 28 is configured to identify the zero-hit statement as the first statement of the given rule causing zero hits against the log data based on one of the (shortest) test rules 44 yielding zero hits against the log data 22. In some embodiments, the processor 28 is configured to identify the zero-hit statement based on the last statement (which is the generally the narrowest statement in the test rule 44) of a shortest test rule 44 yielding zero hits against the log data. For example, if test rule 3 including statements 1, 2 and 3 yields zero hits, and test rule 4 including statements 1, 2, 3, and 4 yields zero hits, then test rule 3 (the shortest test rule) identifies the zero hit statement as statement 3 (being the last statement of test rule 3) and being the first statement of the given rule to yield zero hits against the log data 22.

Once the zero-hit statement has been identified other checks may be performed as follows. In some embodiments, the method continues with the step of block 128, described below.

In some embodiments, the processor 28 is configured to check if the zero-hit statement is a general (i.e., broadest) statement of the given rule (block 122). If the zero-hit statement is the general statement of the given rule, this may indicate that the server 12 is not receiving relevant log files from the log data sources 14 to trigger even the broadest statement of the given rule.

The processor 28 may be configured to correct the zero-hit statement of the given rule (e.g., based on performing a dictionary lookup to correct spelling mistakes such as with respect to fields in the log data 22) (block 130). In some embodiments, the given rule may be sent to a human expert to examine and correct the rule. The processor 28 may be configured to test the corrected rule using additional test rules generated from the statements of the corrected rule to check that the corrected rule has been fixed, i.e., that the zero-hit statement no longer yields zero hits (block 132). The processor 28 may be configured to provide the corrected rule to the system administrator 16 to copy into the rules in the server 12 or provide an option to amend the rule in the server 12.

The processor 28 may be configured to provide an alert indicating any one or more of the following: the zero-hit statement that is causing zero hits against the log data 22; that the given rule is broken and needs fixing; to check that the server 12 is receiving log data 22 related to the zero-hit statement (especially if the zero-hit statement is the broadest statement in the given rule as determined in the step of block 122).

An example rule is listed below. The rule has an error that will be elaborated on after the example rule.

The example rule is:

--- let MonitoredActivities = dynamic([ 'Create or Update Virtual Network', 'Create/Update Azure Database for MariaDB Private Endpoint Connection Proxy', 'Create/Update MariaDB Server', 'Delete Azure Database for MariaDB Private Endpoint Connection Proxy', 'Delete Container Registry', 'Delete MariaDB Server', 'Delete Private Endpoint Connection Proxy', 'Delete Virtual Network', //'List Container Registry Login Credentials', 'Update Configuration', 'Update server threat detection policy', //'Update Key Vault', 'Validate Azure Database for MariaDB Private Endpoint Connection Creation by NRP', 'Validate Private Endpoint Connection Proxy' 1);
  AzureActivity
  | where TimeGenerated >= ago(24h)
  | where OperationName in (MonitoredActivities)
  | project TimeGenerated, OperationName, Caller, CallerIpAddress, Resource, ResourceGroup
  | summarize NumberOfActivities=count( ), First=min(TimeGenerated), Last=max(TimeGenerated), IP Addresses=make set(CallerIpAddress, 5), Operations = make set(OperationName, 5) by HostCustomEntity = Caller, bin(TimeGenerated, 1h)
  | sort by NumberOfActivities desc

---

In some embodiments, the processor 28 is configured to check whether the zero-hit statement caused non-zero hits last time the given rule was tested by the processor 28 (block 124). If the zero-hit statement did cause zero hits the last time the given rule was tested, the method continues with the step of block 128. If the zero-hit statement did not cause zero hits the last time the given rule was tested, the processor 28 is configured to check whether the given rule has been amended since the last time the given rule was tested by the processor 28 (block 126). The given rule may be identified in the database 34 using a rule identifier of the given rule. The previous version of the given rule (stored in the database 34) may be checked with the current version of the given rule to determine if the given rule has been amended by computing a hash of each version of the given rule using a suitable hash function, such as MD5 and SHA-2, and then compare the computed hashes.

The processor 28 is configured to perform an action responsively to identifying the zero-hit statement (block 128). The action may include any suitable action. Some example actions are described below.

After generating test rules 44 for the above example rule it was found that the "OperationName" statement yields zero hits. It was then found that the OperationName field does not exist in the log data 22. However, it was found that values of the Azure activities listed above were included in OperationName Value. Therefore, it may be concluded that OperationName should have been OperationName Value. The rule may be fixed in multiple ways. However, the rule was fixed by using another definition to redefine OperationName to include OperationName Value as shown below by the statement:

---

| extend OperationName=case(OperationName Value="Microsoft.Network/virtualNetworks/write". . . . . .

---

The fixed rule is as follows:

```
let MonitoredActivities = dynamic([ 'Create or Update Virtual
Network', 'Create/Update Azure Database for MariaDB Private Endpoint
Connection Proxy', 'Create/Update MariaDB Server', 'Delete Azure Database for
MariaDB Private Endpoint Connection Proxy', 'Delete Container Registry', 'Delete
MariaDB Server', 'Delete Private Endpoint Connection Proxy', 'Delete Virtual
Network', //'List Container Registry Login Credentials', 'Update Configuration',
'Update server threat detection policy', //'Update Key Vault', 'Validate Azure
Database for MariaDB Private Endpoint Connection Creation by NRP', 'Validate
Private Endpoint Connection Proxy' 1); AzureActivity
    | where TimeGenerated >= ago(24h)
    | extend OperationName=case(OperationName Value="Microsoft.
Network/virtualNetworks/write", "Create or Update Virtual Network",
OperationName Value="Microsoft.DBforMariaDB/servers/privateEndpointConnec
tionProxies/write", "Create/Update Azure Database for MariaDB Private Endpoint
Connection Proxy", OperationName Value="Microsoft.DBforMariaDB/
servers/write", "Create/Update MariaDB Server", OperationName Value
="Microsoft.DBforMariaDB/servers/private EndpointConnectionProxies/delete ",
"Delete Azure Database for MariaDB Private Endpoint Connection
Proxy", OperationName Value="Microsoft.ContainerRegistry/registries/delete ",
"Delete Container Registry", OperationName Value="Microsoft.
DBforMariaDB/servers/delete ", "Delete MariaDB Server", OperationName Value
in ("Microsoft Cache! redis /privateEndpointConnectionProxies /delete",
"Microsoft.Cache/redisEnterprise/privateEndpointConnectionProxies/delete",
"Microsoft.Relay/namespaces/privateEndpointConnectionProxies/validate/action",
"Microsoft.ServiceBus/namespaces/privateEndpointConnectionProxies/validate/ac
tion", "Microsoft.ApiManagement/service/privateEndpointConnectionProxies/
validate/action", "Microsoft.Media/mediaservices/privateEndpointConnection
Proxies/validate/action", "Microsoft.Media/videoAnalyzers/privateEndpoint
ConnectionProxies/validate/action", "Microsoft.ContainerRegistry/registries/
privateEndpointConnectionProxies/validate/action", "Microsoft.AppConfiguration/
configurationStores/privateEndpointConnectionProxies/validate/action",
"Microsoft.Connected Vehicle/platformAccounts/privateEndpointConnectionProxi
es/validate/action", "Microsoft.DeviceUpdate/accounts/privateEndpoint
ConnectionProxies/validate/action", "Microsoft.Kusto/Clusters/SKUs/Private
EndpointConnectionProxyValidation/action", "Microsoft . Purview/accounts
/private EndpointConnectionProxies/validate/action", "Microsoft.SignalRService/
SignalR/privateEndpointConnectionProxies/validate/action", "Microsoft.SignalR
Service/WebPubSub/privateEndpointConnectionProxies /validate /action",
"Microsoft.Synapse/workspaces/kustoPools/PrivateEndpointConnectionProxies/V
alidate/action"), "Validate Private Endpoint Connection Proxy","other")
    | where OperationName in (MonitoredActivities)
    | project TimeGenerated, OperationName, Caller, CallerIpAddress,
Resource, ResourceGroup
    | summarize    NumberOfActivities=count( ),    First=min
(TimeGenerated),    Last=max(TimeGenerated),    IPAddresses=make
set(CallerIpAddress, 5), Operations = make set(OperationName, 5) by
HostCustomEntity = Caller, bin(TimeGenerated, 1h)
    | sort by NumberOfActivities desc
```

In practice, some, or all of the functions of the processor 28 may be combined in a single physical component or, alternatively, implemented using multiple physical components. These physical components may comprise hard-wired or programmable devices, or a combination of the two. In some embodiments, at least some of the functions of the processor 28 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A device, comprising:
   a processor configured to:
      receive a given rule from a detection service, the given rule including multiple statements separated by separators, wherein each statement defines a condition to be checked against log data;
      generate multiple test rules from the given rule, wherein each test rule includes a different number of statements taken in order from the beginning of the given rule;
      identify a zero-hit statement being a statement of the multiple statements of the given rule causing zero hits against the log data, wherein the zero-hit statement is identified as a last statement of a shortest test rule yielding zero hits against the log data; and perform an action responsively to identifying the zero-hit statement; and a memory configured to store data used by the processor.

2. The device according to claim 1, wherein the processor is configured to:
provide the test rules to the service to run each of the test rules against log data;
receive a number of hits against the log data for each of the test rules; and
identify the zero-hit statement based on one of the test rules yielding zero hits against the log data.

3. The device according to claim 2, wherein the processor is configured to identify the zero-hit statement as a first statement of the multiple statements of the given rule causing zero hits against the log data based on one of the test rules yielding zero hits against the log data.

4. The device according to claim 2, wherein:
the processor is configured to generate the test rules so that one of the test rules includes a first N statements of the multiple statements of the given rule, and another one of the test rules includes a first M statements of the multiple statements of the given rule, N being different to M;
the number of hits against the log data for any one of the test rules indicates a contribution of a last statement of the one test rule; and
the processor is configured to identify the zero-hit statement based on the last statement of a shortest one of the test rules yielding zero hits against the log data.

5. The device according to claim 4, wherein the processor is configured to select the test rules to be provided to the service using a binary search algorithm.

6. The device according to claim 4, wherein the processor is configured to rule out at least one of the statements in the given rule as being the zero-hit statement based on a preliminary analysis of the given rule.

7. The device according to claim 4, wherein the processor is configured to reorder, in at least some of the test rules, sub-statements of one statement selected from the multiple statements of the given rule.

8. The device according to claim 1, wherein the service is a security information and event management (SIEM) service, and the given rule is a SIEM correlation rule.

9. The device according to claim 1, wherein the processor is configured to:
check whether the zero-hit statement caused non-zero hits last time the given rule was tested by the processor; and
check whether the given rule has been amended since the last time the given rule was tested by the processor.

10. The device according to claim 1, wherein the processor is configured to correct the zero-hit statement of the given rule.

11. The device according to claim 10, wherein the processor is configured to test the corrected rule using additional test rules generated from the statements of the corrected rule to check that the corrected rule has been fixed.

12. The device according to claim 1, wherein the processor is configured to provide an alert indicating any one or more of the following: the zero-hit statement that is causing zero hits against the log data; that the given rule is broken; to check that the service is receiving log data related to the zero-hit statement.

13. A method, comprising:
receiving a given rule from a detection service, the given rule including multiple statements separated by separators, wherein each statement defines a condition to be checked against log data;
generating multiple test rules from the given rule, wherein each test rule includes a different number of statements taken in order from the beginning of the given rule;
identifying a zero-hit statement being a statement of the multiple statements of the given rule causing zero hits against the log data, wherein the zero-hit statement is identified as a last statement of a shortest test rule yielding zero hits against the log data; and
performing an action responsively to identifying the zero-hit statement.

14. The method according to claim 13, further comprising:
providing the test rules to the service to run each of the test rules against log data; and
receiving a number of hits against the log data for each of the test rules, and wherein the identifying includes identifying the zero-hit statement based on one of the test rules yielding zero hits against the log data.

15. The method according to claim 14, wherein the identifying includes identifying the zero-hit statement as a first statement of the multiple statements of the given rule causing zero hits against the log data based on one of the test rules yielding zero hits against the log data.

16. The method according to claim 14, wherein:
the generating includes generating the test rules so that one of the test rules includes a first N statements of the multiple statements of the given rule, and another one of the test rules includes a first M statements of the multiple statements of the given rule, N being different to M;
the number of hits against the log data for any one of the test rules indicates a contribution of a last statement of the one test rule; and
the identifying includes identifying the zero-hit statement based on the last statement of a shortest one of the test rules yielding zero hits against the log data.

17. The method according to claim 16, further comprising selecting the test rules to be provided to the service using a binary search algorithm.

18. The method according to claim 16, further comprising ruling out at least one of the statements in the given rule as being the zero-hit statement based on a preliminary analysis of the given rule.

19. The method according to claim 16, further comprising reordering, in at least some of the test rules, sub-statements of one statement selected from the multiple statements of the given rule.

20. The method according to claim 13, wherein the service is a security information and event management (SIEM) service, and the given rule is a SIEM correlation rule.

21. The method according to claim 13, further comprising:
checking whether the zero-hit statement caused non-zero hits last time the given rule was tested; and
checking whether the given rule has been amended since the last time the given rule was tested.

22. The method according to claim 13, further comprising correcting the zero-hit statement of the given rule.

23. The method according to claim 22, further comprising testing the corrected rule using additional test rules generated from the statements of the corrected rule to check that the corrected rule has been fixed.

24. The method according to claim 13, further comprising providing an alert indicating any one or more of the following: the zero-hit statement that is causing zero hits against the log data; that the given rule is broken; to check that the service is receiving log data related to the zero-hit statement.

25. A software product, comprising a non-transient computer-readable medium in which program instructions are stored, which instructions, when read by a central processing unit (CPU), cause the CPU to:
receive a given rule from a detection service, the given rule including multiple statements separated by separators, wherein each statement defines a condition to be checked against log data;
generate multiple test rules from the given rule, wherein each test rule includes a different number of statements taken in order from the beginning of the given rule;
identify a zero-hit statement being a statement of the multiple statements of the given rule causing zero hits against the log data, wherein the zero-hit statement is identified as a last statement of a shortest test rule yielding zero hits against the log data; and
perform an action responsively to identifying the zero-hit statement.

* * * * *